United States Patent [19]

Sway-Tin et al.

[11] Patent Number: 5,568,052
[45] Date of Patent: Oct. 22, 1996

[54] PERFORMANCE MONITOR FOR ELECTRIC VEHICLE

[75] Inventors: Min Sway-Tin, Troy; Thaddeus Roterman, Shelby Township, Macomb County; Joseph F. Impullitti, Farmington Hills; David S. Meir, West Bloomfield; Ronald A. Zawacki, Canton, all of Mich.

[73] Assignee: Chrysler Corporation, Auburn Hills, Mich.

[21] Appl. No.: 352,994

[22] Filed: Dec. 9, 1994

[51] Int. Cl.$^6$ .................................................. B60R 25/10
[52] U.S. Cl. .......................... 324/435; 324/427; 340/636; 340/428; 320/33; 320/48
[58] Field of Search ....................... 340/636, 428; 320/39, 32, 33, 43, 48; 324/427, 435

[56]  References Cited

U.S. PATENT DOCUMENTS

| | | |
|---|---|---|
| 3,971,980 | 7/1976 | Jungfer et al. |
| 4,275,351 | 6/1981 | Harer et al. |
| 4,390,841 | 6/1983 | Martin et al. |
| 4,445,090 | 4/1984 | Melocik et al. |
| 4,558,281 | 12/1985 | Codd et al. |
| 4,575,679 | 3/1986 | Chung et al. |
| 4,595,880 | 6/1986 | Patil. |
| 4,719,427 | 1/1988 | Morishita ................................. 320/48 |
| 4,929,931 | 5/1990 | McCuen. |
| 5,130,659 | 7/1992 | Sloan. |
| 5,352,982 | 10/1994 | Nakazawa ............................... 340/636 |
| 5,394,089 | 2/1995 | Clegg ........................................ 320/48 |

Primary Examiner—Kenneth A. Wieder
Assistant Examiner—Jose M. Solis
Attorney, Agent, or Firm—Christopher A. Taravella

[57] ABSTRACT

A system (10) and method for monitoring usage of current immediately available from the traction batteries (12) of an electric vehicle includes a means (18) for generating a signal representative of the current being drawn from the batteries (12); a means (20) for generating a signal representative of the maximum current available from the batteries (12) for immediate use; and a means (22) responsive to the drawn-current signal and the maximum-available-current signal for generating a usage signal representing the ratio of drawn current to maximum-available current. A display, such as an analog meter (24) responsive to the usage signal and calibrated from zero-percent to one-hundred-percent available current usage, displays the transitory current usage as a percentage of maximum-available current. Where the batteries (12) supply current to both the vehicle's traction motors (14) and noncritical electrical components (16), a relay (28) responsive to the usage signal sheds the noncritical component's load from the batteries (12) when current usage rises above a given level. A current limiter (30) responsive to the usage signal is preferably also provided to limit the supply of current to the traction motors (14) when current usage rises above a still higher level.

18 Claims, 1 Drawing Sheet

PERFORMANCE MONITOR FOR ELECTRIC VEHICLE

TECHNICAL FIELD

This invention generally relates to systems and methods for monitoring the transitory demands for electric current from the traction batteries of an electrically-powered vehicle. More specifically, this invention relates to systems and methods for monitoring the transitory demands for current from the vehicle's batteries so as to provide its operator with an indication as to how those transitory demands for current relate to the maximum amount of current available from the batteries for immediate use, thereby apprising the vehicle operator of any potential current-based restriction on vehicle performance. This invention further relates to systems and methods for modifying current usage in an electric vehicle based on transitory usage of available battery current.

BACKGROUND OF THE INVENTION

In an effort to improve air quality, battery-powered "electric" vehicles are becoming increasingly common in today's automotive marketplace. These electric vehicles typically include traction batteries for supplying electric current to one or more traction motors which, in turn, provide motive power to the vehicle. Accordingly, the vehicle's ability to perform a manoeuvre at any given time at the direction of the vehicle operator directly depends upon the condition of the traction batteries at that time. The condition of each battery, in turn, varies upon such transitory factors as its temperature and its State of charge, as well as other long-term factors as battery aging, polarization effects, etc. Variation in these parameters will substantively affect the manner in which each battery can supply current to the vehicle's traction motors and, hence, the manner in which the vehicle will respond to commands from its operator. Stated another way, in certain situations or under certain load conditions, the vehicle's traction batteries may be unable to meet the transitory current demands of the vehicle which, in turn, will limit the vehicle's temporal capability to perform.

Significantly, the vehicle operator may not realize the qualitative and quantitative limitation on vehicle performance imposed by the condition of the traction batteries. Indeed, these limitations will likely conflict with the operator's own expectations of vehicle performance, given that he will likely have become accustomed to the manner in which vehicles powered by internal combustion engines operate. Specifically, the output of an internal combustion engine and, hence, the responsiveness of a vehicle powered by such an engine, is not noticeably dependent upon the temporal quality of the hydrocarbon-based fuel stored within the vehicle's fuel tank, e.g., the temperature or age of the fuel. Rather, the engine's output is singularly dependent upon the presence of such fuel within the fuel tank. So long as fuel is present, the engine will provide full power upon demand. Indeed, absent an nearly-empty fuel tank, the operator of a vehicle powered by an internal combustion engine will not typically check the vehicle's fuel gauge immediately prior to executing, say, a passing manoeuvre, since it will have no bearing on the vehicle's performance capabilities.

Given the likely expectations of the vehicle operator, there may come a time when he will attempt a manoeuvre that cannot be performed given the amount of current immediately available from the traction batteries, thereby placing the operator, his vehicle and others at great risk of injury. What is needed, then, is a performance monitor for an electric vehicle which can communicate to the vehicle operator, preferably in a familiar fashion, an indication of his present use of available battery "power" so that the operator may then form a reasonable expectation as to the vehicle's further capability to perform at that instant.

Another limitation on the temporal performance capabilities of the typical electric vehicle derives from the correlative use of the traction batteries for supplying current to noncritical electrical components within the vehicle, such as the climate control system's blower fan motor, AC compressor or resistance heater, As a result, the traction batteries are forced to perform "double duty," even in the face of a demand for increased motive performance from the vehicle operator. The increased load from these noncritical components may dangerously limit the amount of current available as for an emergency manoeuvre, again, placing the operator, his vehicle and others at risk. What is also needed, then, is a vehicle performance monitor for an electric vehicle that can shed these noncritical loads on the traction batteries should their current requirements reduce reserve battery current below an acceptable minimum level, given the transitory amount of current then being supplied to the traction motors.

SUMMARY OF THE INVENTION

An object of the invention is to provide a system and method for displaying to the operator of an electric vehicle an indication of vehicle performance reserve available at any given time.

Another object of the invention is to provide a system and method for displaying to the operator of an electric vehicle an indication of his present use of available battery current so that the operator may then form a reasonable expectation as to the vehicle's further capability to perform.

A further object of the invention is to provide a means and method for controlling power usage in an electric vehicle whose traction batteries supply current to both a traction motor and noncritical electrical components, wherein noncritical loads are shed as the ratio of current being drawn from the batteries to the maximum amount of current immediately available therefrom exceeds a first maximum threshold level.

Yet another object of the invention is to provide a means and method for controlling current usage in an electric vehicle, wherein the supply of current from the vehicle's traction batteries to noncritical components is interrupted and the supply of current to the traction motor is limited as the ratio of current being drawn from the batteries to the maximum amount of current immediately available therefrom exceeds a second maximum threshold level.

Under the present invention, in a vehicle having at least one traction battery supplying current to a traction motor and a noncritical electrical component, a system for monitoring the transitory usage of the battery's maximum-available current includes a means for detecting the current being drawn from the battery; and a means connected to the battery for determining the maximum amount of current available from the battery for immediate use. In a preferred embodiment, the means for determining the maximum amount of current immediately available from the battery includes a means for sensing the condition of the battery through measurement and/or tracking of such battery parameters as temperature, state-of-charge, age, charging history, etc.

The system of the present invention further includes a means responsive to the drawn-current signal and the maximum-available-current signal for generating a signal representative of the ratio of the drawn-current signal to the maximum-available-current signal. This ratiometric signal thus provides information as to the relative transitory usage of the battery's maximum-available current.

The system also includes a display, such as an analog meter, responsive to the usage signal for displaying the usage signal to the operator of the vehicle. The vehicle operator may thus make an informed judgment as to the propriety of, for example, a passing manoeuvre, given his transitory usage of the battery's maximum-available current. In a preferred embodiment, the analog meter is calibrated from zero-percent to one-hundred percent usage of maximum-available current, thereby providing the vehicle operator with a familiar display that is somewhat analogous to a tachometer in a gasoline-powered vehicle.

In accordance with another feature of the present invention, the system preferably includes a load-shedding means responsive to the usage signal for interrupting the supply of current from the battery to noncritical electrical components when the usage signal exceeds a first maximum threshold level. The system preferably also includes a current limiter, likewise responsive to the usage signal, for limiting the supply of current from the traction battery to the traction motor when the usage signal exceeds a second maximum threshold level, with the second maximum threshold level being greater than the first maximum threshold level at which the shedding of noncritical loads occurs.

DETAILED DESCRIPTION OF THE PREFERRED EMBODIMENT (S)

Figure 1:
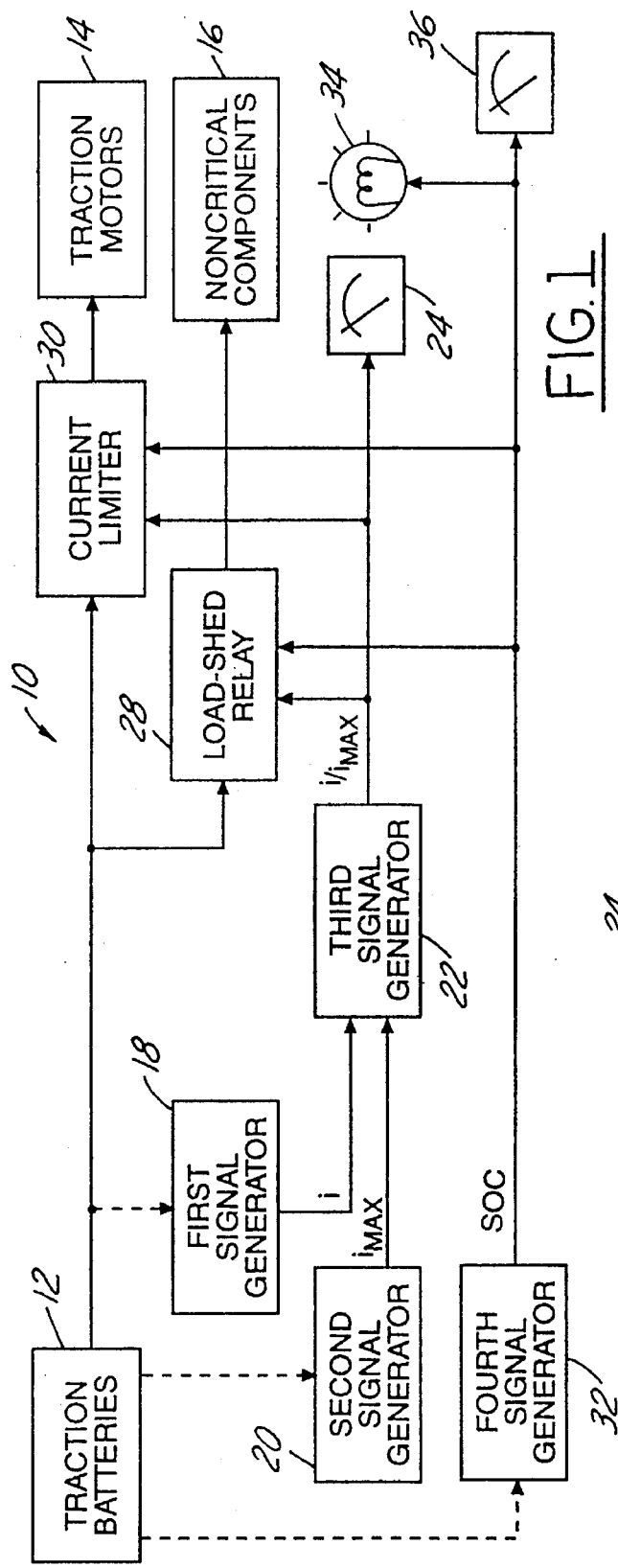
FIG. 1 is a diagram of a preferred system for monitoring the transitory usage of current from an electric vehicle's traction battery in accordance with the invention.

A preferred system 10 for monitoring the transitory usage by an electric vehicle of its traction battery's available current is illustrated in FIG. 1. Specifically, an electric vehicle (not shown) typically includes at least one, but more typically many, traction batteries 12 for supplying electric current to one or more traction motors 14. The traction motors 14 in turn provide motive power for the vehicle. And, as in the typical electric vehicle, the traction batteries 12 also Supply electric current to one or more noncritical electrical components 16 within the vehicle. A noncritical component 16 is a component to which current may be interrupted upon experiencing a shortage of available battery current, without compromising the safety of the vehicle or its passengers. An example of a noncritical component 16 is the blower fan motor used in a vehicle's climate control system.

As seen in FIG. 1, a pair of signal generators 18 and 20 are connected to the traction batteries 12. The first signal generator 18 generates a signal representative of the current then being drawn from the batteries 12, both by the traction motors 14 and by the noncritical components 16. The second signal generator 20, itself responsive to one or more battery parameters, generates a signal representative of the maximum current immediately available from the batteries 12.

The specific battery parameters used by the second signal generator 20 in generating the maximum-available-current signal will be recognized by those of ordinary skill as including, without limitation, such parameters as temperature, state-of-charge, age, charging history, etc. The second signal generator 20 will preferably also be responsive to such other factors as the variations between the parameters of individual cells in a multi-cell battery pack, including the presence of a bad cell in the battery pack. The specific manner in which the second signal generator 20 itself generates the maximum-available-current signal from such battery parameters is likewise known to those of ordinary skill.

A third signal generator 22 receives as input the drawn-current signal generated by the first signal generator 18 and the maximum-available-current signal generated by the second signal generator 20, respectively. The third signal generator 22 then generates a signal representative of the ratio of drawn current to the maximum-available current. This ratiometric signal, or usage signal, generated by the third signal generator 22 thus represents, in real time, the vehicle's relative usage of the batteries' maximum-available current at any given time.

Figure 2:
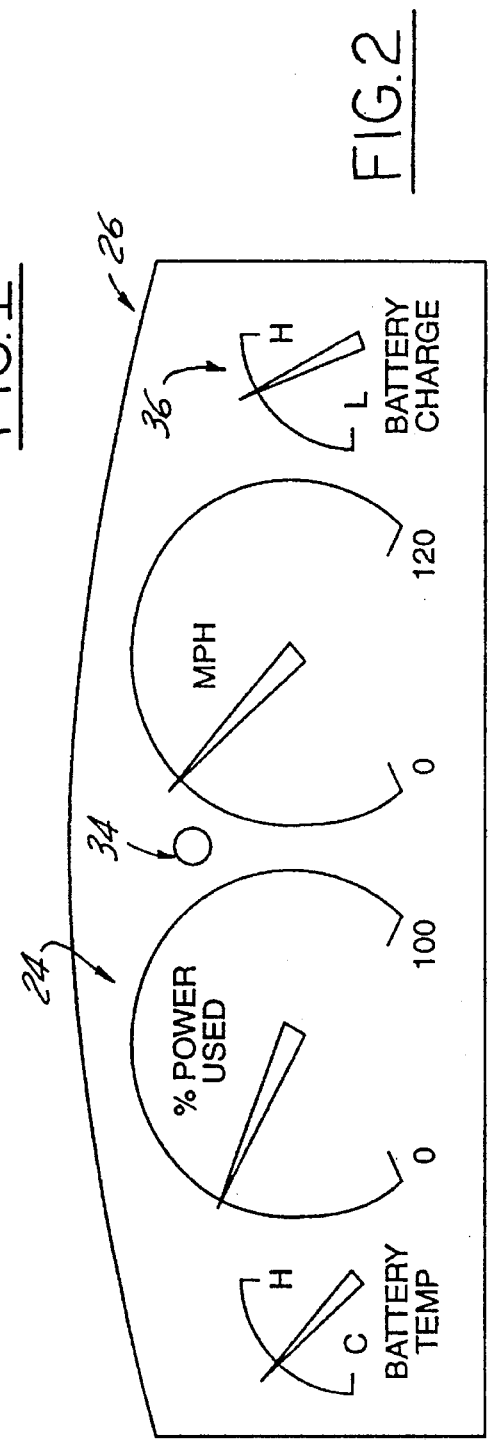
FIG. 2 is a partial view in elevation of a dashboard for an electric vehicle which includes an analog meter to display to the vehicle operator its transitory usage of the battery's available current.

The usage signal is then provided to a suitable display, such as an analog meter indicated at 24 in FIG. 1 and further shown as part of a vehicle dashboard 26 in FIG. 2. With this information, the vehicle operator may make an informed judgment as to the propriety of, for example, a passing manoeuvre, given the displayed usage of the traction batteries' maximum-available current.

And, as seen in FIG. 2, the usage meter 24 is preferably calibrated from zero-percent to one-hundred percent usage of the traction batteries's maximum-available current, thereby providing the vehicle operator with a familiar display that is somewhat analogous to a tachometer in a gasoline-powered vehicle. Indeed, as further illustrated in FIG. 2, the usage meter 24 may include a colloquially-descriptive but otherwise technically inaccurate caption, "% POWER USED."

And, in a manner further analogous to the markings on a tachometer, "redline" markings are preferably provided beginning at perhaps eighty to ninety percent relative usage to indicate to the operator the likely absence of available "power margin" at such usage levels. Such redline markings are likewise shown in FIG. 2 as an arcuate band on the usage meter 24 extending from eighty-five percent to one-hundred percent "power" usage.

Referring again to FIG. 1, in accordance with another feature of the present invention, the traction batteries 12 are connected to the noncritical components 16 through a load-shed means, such as a load-shed relay 28. The load-shed relay 28 is responsive to the control signal so as to interrupt the flow of current from the batteries 12 to the noncritical component 16 when the control signal exceeds a first maximum threshold level. In this manner, the operation of noncritical components 16 is interrupted to effectively provide a current reserve for other components whose continued operation is essential to maintaining the safety of the vehicle and its passengers.

Unfortunately, even after the shedding of noncritical load, it is still possible that the maximum amount of current available from the traction batteries 12 for immediate use is less than the current requirements of the traction motors 14 standing alone. Indeed, such a situation may arise notwithstanding a relatively-high battery state-of-charge due, for example, to extreme temperatures or, even, a bad cell within a given battery pack. Accordingly, in the system 10 shown in FIG. 1, the traction batteries 12 are connected to the traction motors 14 through a current limiter 30.

The current limiter 30 is itself responsive to the usage signal to limit the flow of current from the traction batteries 12 to the traction motors 14 when the usage signal exceeds a second maximum threshold level. And, since current to the traction motors 14 should be limited only after noncritical loads have already been shed, the second maximum threshold level triggering such current limiting is necessarily greater than the first maximum threshold level triggering interruption of the supply of current to the noncritical components 16. In this manner, the present system 10 acts to prevent deleterious deep discharge of the traction batteries 12 when maximum-available current is insufficient to accommodate even the current requirements of the traction motors 14 alone.

In accordance with yet another feature of the present invention, the system 10 as seen in FIG. 1 further includes a fourth signal generator 32. The fourth signal generator 32 generates a signal evaluative of the temporal capacity of the traction batteries 12, as might be approximated using battery state-of-charge. The system 10 further includes an indicator light 34 responsive to the battery-capacity signal for displaying battery-capacity information directly to the vehicle operator. The indicator light 34 may be incorporated into the vehicle dashboard 26 proximate to the usage signal's analog display 24, as illustrated in FIG. 2. In this way, the indicator light 34 can serve to draw the attention of the vehicle operator to the usage meter 24 in the event a reduced battery capacity further restricts the capability of the vehicle to perform. A second analog display 36 on the vehicle dashboard, also responsive to the battery-capacity signal, provides a "fuel gauge" for use by the vehicle operator.

The load-shed relay 28, described above as being responsive to the usage signal, is preferably further responsive to the battery-capacity signal generated by the fourth signal generator 32. Specifically, the load-shed relay 28 will preferably operate to shed noncritical loads when the battery-capacity signal falls below a first minimum threshold level.

Similarly, the current limiter 30 described above as being responsive to the usage signal is likewise also responsive to the battery-capacity signal generated by the fourth signal generator 32. The current limiter 30 will thus operate to limit the current being supplied to the vehicle's traction motors 14 when the battery-capacity signal falls below falls below a second minimum threshold level. For reasons similar to those discussed hereinabove with respect to the first and second maximum threshold levels, the second minimum threshold level is quantitatively less than the first minimum threshold level, so that the current supplied to the traction motors 14 is limited only after noncritical loads have been shed.

While the preferred embodiments of the invention have been disclosed, it should be appreciated that the invention is susceptible of modification without departing from the spirit of the invention or the scope of the subjoined claims.

We claim:

1. In an electric vehicle having a battery supplying current to both a traction motor and a noncritical electrical component, a system for monitoring the usage of said battery's maximum-available current comprising:

a first means connected to said battery for generating a signal representative of the current being drawn from said battery;

a second means connected to said battery for generating a signal representative of the maximum current available for immediate use from said battery;

a third means responsive to the drawn-current signal and the maximum-available-current signal for generating a usage signal representative of the ratio of the drawn-current signal to the maximum-available-current signal;

a display responsive to the usage signal for displaying the relative usage of maximum-available current to an operator of said vehicle; and a relay, responsive to the usage signal, for interrupting the supply of current from said battery to said noncritical electrical component when the usage signal exceeds a first maximum threshold level.

2. The system of claim 1, wherein said means for generating the maximum-available-current signal includes a means for sensing the condition of said battery.

3. The system of claim 2, wherein said means for generating the maximum-available-current signal includes a means for sensing the temperature of said battery.

4. The system of claim 1, wherein said display means includes an analog meter calibrated from zero to one-hundred percent usage of maximum-available current.

5. A method for monitoring, in a vehicle having a battery supplying current to both a traction motor and a noncritical electrical component, the transitory usage of said battery's maximum-available current, said method comprising the steps of:

generating a first signal representative of the current being drawn from said battery;

generating a second signal representative of the maximum current available for immediate use from said battery;

generating a usage signal representing the ratio of the drawn-current signal to the maximum-available-current signal;

displaying the usage signal to an operator of said vehicle; and comparing the usage signal to a first maximum threshold level; and interrupting the supply of current from said battery to said noncritical electrical component when the usage signal exceeds the first maximum threshold level.

6. The system of claim 1, including a means for generating a signal representative of the capacity of said battery, and wherein said relay is further responsive to the battery-capacity signal to interrupt the supply of current from said battery to said noncritical electrical component when the battery-capacity signal falls below a first minimum threshold level.

7. The system of claim 6, wherein said battery-capacity signal is evaluative of the state-of-charge of said battery.

8. The system of claim 1, including a means responsive to the usage signal for limiting the supply of current from said battery to said traction motor when the usage signal exceeds a second maximum threshold level.

9. The system of claim 8, including a means for generating a signal representative of the capacity of said battery, and wherein said current-limiting means is further responsive to the battery-capacity signal to limit the supply of current from said battery to said traction motor when the battery-capacity signal falls below a second minimum threshold level.

10. The system of claim 9, wherein said battery-capacity signal is evaluative of the state-of-charge of said battery.

11. The system of claim 5, including the steps of generating a signal representative of the capacity of said battery; comparing the battery-capacity signal to a first minimum threshold level; and limiting the supply of current from said battery to said traction motor when the battery-capacity signal falls below a second minimum threshold level.

12. The method of claim 5, wherein said step of generating the maximum-available-current signal includes the step of sensing the condition of said battery.

13. The method of claim 12, wherein step of sensing the condition of said battery includes the step of sensing the temperature of said battery.

14. The method of claim 5, wherein said step of displaying the usage signal includes displaying the usage signal as a percentage on an analog meter calibrated from zero-percent to one-hundred percent usage of maximum-available current.

15. The method of claim 11, wherein said battery-capacity signal is evaluative of the state-of-charge of said battery.

16. The method of claim 5, including the steps of generating a signal representative of the capacity of said battery; comparing the battery-capacity signal to a first minimum threshold level; and interrupting the supply of current from said battery to said noncritical electrical component when the battery-capacity signal falls below the first minimum threshold level.

17. The system of claim 16, wherein said battery-capacity signal is evaluative of the state-of-charge of said battery.

18. The method of claim 5, further comprising the steps of comparing the usage signal to a second maximum threshold level; and limiting the supply of current from said battery to said traction motor when the usage signal exceeds the second maximum threshold level.

* * * * *